United States Patent [19]
Van Romer et al.

[11] Patent Number: 5,090,588
[45] Date of Patent: Feb. 25, 1992

[54] PORTABLE CONTAINMENT FOR CHEMICALS

[75] Inventors: Edward W. Van Romer, Anderson, S.C.; Brian R. Flood, De Kalb, Ill.

[73] Assignee: Portable Containment, Inc., Antigo, Wis.

[21] Appl. No.: 560,435

[22] Filed: Jul. 31, 1990

[51] Int. Cl.$^5$ .............................................. B65D 1/34
[52] U.S. Cl. ..................................... 220/573; 220/9.2; 220/666; 184/106
[58] Field of Search ................. 220/571, 573, 9.1, 9.2, 220/9.3, 401, 403, 666, 4.16, 85 B; 248/160; 184/106

[56] References Cited

U.S. PATENT DOCUMENTS

| | | | |
|---|---|---|---|
| 935,278 | 9/1909 | Smyth | 220/573 |
| 2,321,005 | 6/1943 | Britain | 220/401 |
| 2,405,627 | 8/1946 | Williams | 220/9.2 |
| 2,757,478 | 8/1956 | Borland | 184/106 |
| 2,912,137 | 11/1959 | Taylor | 220/403 |
| 2,990,033 | 6/1961 | Arnold | 184/106 |
| 3,284,273 | 11/1966 | Prentice | 184/106 |
| 3,834,527 | 9/1974 | Howe | 184/106 |
| 3,997,073 | 12/1976 | Morris | 220/573 |
| 4,054,184 | 10/1977 | Marcinro | 220/573 |
| 4,201,307 | 5/1980 | Malloy | 220/573 |
| 4,393,531 | 7/1983 | Hodel | 220/403 |
| 4,484,661 | 11/1984 | Evenson | 220/573 |
| 4,671,024 | 6/1987 | Schumacher | 184/106 |
| 4,798,754 | 1/1989 | Tomek | 184/106 |
| 4,801,005 | 1/1989 | Hahn et al. | 220/573 |
| 4,826,030 | 5/1989 | Valley | 220/573 |

FOREIGN PATENT DOCUMENTS 5817 of 1909 United Kingdom ................ 220/571

Primary Examiner—Stephen Marcus
Assistant Examiner—S. Castellano
Attorney, Agent, or Firm—Cort Flint

[57] ABSTRACT

A portable containment (10) is illustrated for field use in containing pesticides and other toxic chemicals and the like. Containment (10) includes a floor (12) and integral side walls (16, 18, 20, 22). Resilient side braces (A), bracing straps (B), and compressible top braces (C), provide resiliency so that the upstanding walls deform to allow a wheeled vehicle or aircraft (13) to roll onto and off of the containment in the field. Elastic corners (D) allow the side walls and corners to be deformed outwardly or inwardly without tearing or damage of the corners or upstanding walls.

30 Claims, 3 Drawing Sheets

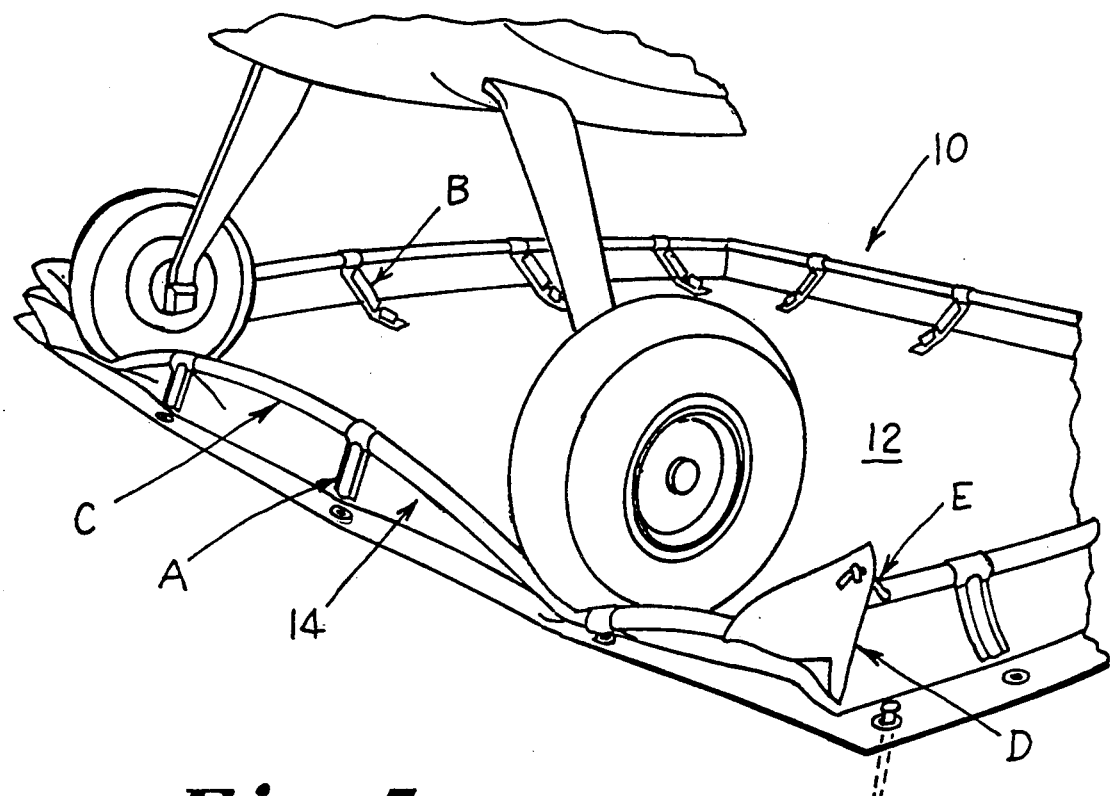

PORTABLE CONTAINMENT FOR CHEMICALS

BACKGROUND OF THE INVENTION

The invention relates to a portable containment device for hazardous chemicals such as agricultural chemicals, and the like, and the prevention of ground water contamination by the chemicals. Ground water contamination is the long-term result of point source spills and application of long-term residual water-dispersible, general use pesticides and other hazardous or toxic chemicals. These spills result from mixing, loading, and unloading, clean-up, and disposal of chemicals and the like. States regulate commercial bulk pesticide storage locations and commercial mixing and loading sites. However, the current containment regulations are directed towards fixed base location sites. Regulations have not been directed to field mixing and loading sites due to cost and compliance problems. In particular, the problem of loading and offloading pesticides during applications at on-site farm field locations and preventing ground water contamination is a problem to which considerable attention need be given. In handling the toxic chemicals, pesticides, and the like, it is necessary to contain the chemicals in case of a spill to prevent contact with the surrounding environment. In the handling of pesticides in large volumes, it is necessary to prevent spills of the pesticides from being absorbed in the soil and eventually contaminating water systems. For example, in agricultural use, toxic chemicals are often loaded from tank truck vehicles to or from agricultural spraying airplanes or other application vehicles. In the transfer of the chemicals, spills can occur and it is necessary to prevent the spill from absorption in the soil.

In the past, temporary, disposable, or stationary containments have been provided in which a plastic membrane or fabric which contains the chemical is supported by air inflatable walls or foam for containing the chemical. U.S. Pat. No. 4,671,024 discloses a disposable drip pan for use under a vehicle which contains dirt or other matter and to prevent the same from soiling or contaminating a floor surface at a fixed site. Air inflated sleeves or radially compressible pipe tubing form a ridge which surrounds a floor of the drip pan to contain material falling off the vehicle. While a vehicle may be driven over the ridge, the ridge is not sufficient for containing liquid spills, such as agricultural chemicals, in large volumes, nor is it fastened to the floor to prevent dislocation by prop wash from aircraft. The corners are not designed to withstand impact from vehicle traffic. Similar temporary containment systems are known which may be folded, assembled, inflated, and transported having a rubberized fabric which withstands rough treatment and a broad range of chemicals. However, again, the support tubes for the side walls are inflatable with air are susceptible to puncture and are separate pieces that require assembly. With the side walls inflated, considerable risk is involved when driving a vehicle on or off the containment, and the walls must be removed to allow vehicle traffic. To deflate the walls permits liquid to escape the containment.

Accordingly, an object of the invention is to provide a portable containment unit which is economical, portable, and easy to transport and deploy, and which may be reused.

Another object of the invention is to provide a portable containment unit for containing hazardous chemicals and the like which is truly portable in that it may be folded, transported, and reused at different sites without disassembly or reassembly being required.

Another object of the invention is to provide a portable containment unit for the prevention of ground spills which is highly durable and can withstand vehicle traffic onto and off of the unit without altering the unit.

Another object of the invention is to provide a portable containment unit which is portable, requires no assembly at the site, can withstand vehicle traffic over the walls of the containment unit, and can tolerate toxic chemicals such as pesticide solutions.

Another object of the invention is to provide a portable containment unit having all of the above described features which can be reused in the field or at air strips for agricultural pesticide application when loading or unloading aircraft, vehicles, or similar industrial use.

SUMMARY OF THE INVENTION

The above objectives are accomplished according to the invention by providing a portable containment for containing spilled material add preventing environmental contact. A floor is composed of sheet material and deformable upstanding walls composed of sheet material integrally connected to the floor for containing the spilled material in cooperation with the floor. Vertically-extending resilient side braces are attached to the walls and are spaced around a periphery of the wall to brace the walls in an upright position while allowing the walls to resiliently collapse. Flexible bracing straps are attached between the walls and floor to brace the wall to maintain the wall in an upright position. Horizontally-extending top braces are carried by upper portions of the walls to brace the walls in an upright position. The sheet material from the upper portion of the walls extends around the top braces and is secured to an outer surface of the upper portion to form a sleeve and surround the top braces. The top braces include elongated members being compressible inwardly. The walls are deformable to a collapsed position when run over by a vehicle, and the side braces are resilient so that they tend to urge the walls back to an upright position after the vehicle has passed over the walls. Side braces include flexible vertical stays carried within vertical sleeves carried vertically by the walls. The vertical sleeves are formed by extensions of the bracing straps which extend over each of the side braces and are secured to the outer surface. A perimetal flap is carried by the floor and extends outwardly away from the wall means for allowing the device to be fastened to a ground surface. The upstanding walls are joined together by a plurality of elastic corners which elastically expand and retract to allow the upstanding walls to be deformed without damage. The elastic corners means includes a corner gusset formed by the sheet material, and an elastic cord retracting the corner gussets and allowing the corner gussets to expand when the upstanding walls are deformed.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 5 is a perspective view illustrating a vehicle rolling over a collapsible wall of a portable containment constructed in accordance with the present invention.

DESCRIPTION OF A PREFERRED EMBODIMENT

Figure 3:
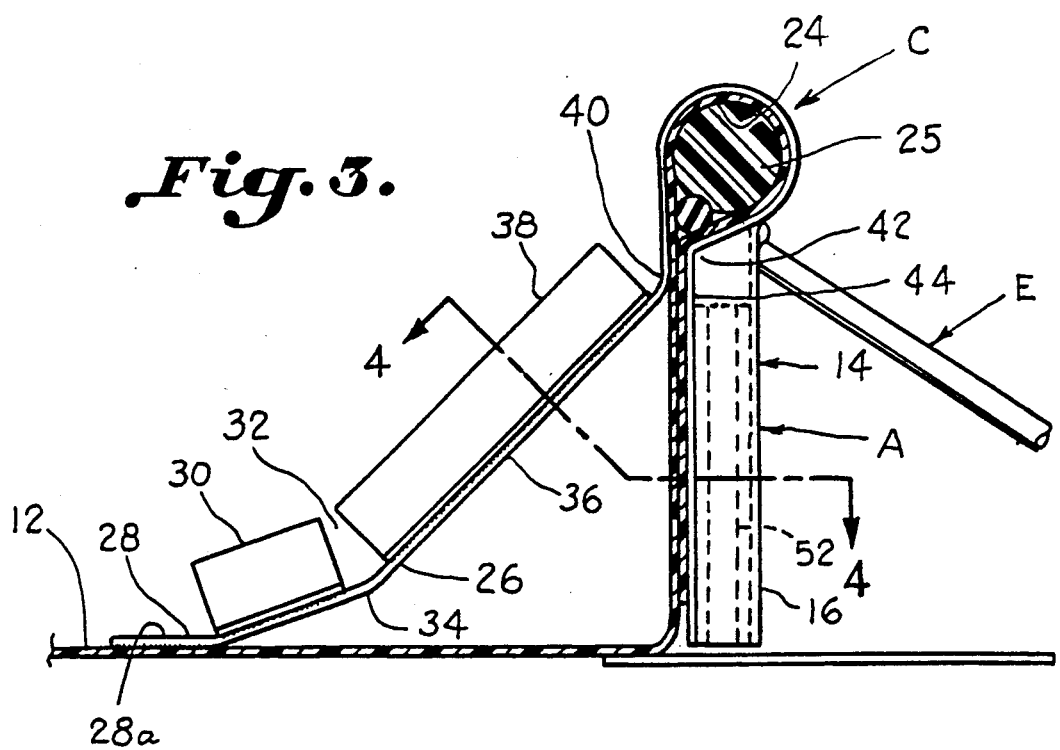
FIG. 3 is sectional view taken along line 3—3 of FIG. 2.

Referring now in more detail to the drawings, a portable containment device, designated generally as 10 is illustrated for containing spilled material such as pesticides and toxic chemicals to prevent environmental contact and ground water contamination. As illustrated, portable containment 10 includes a floor 12 composed of sheet material. A deformable upstanding wall means, designated generally as 14, extends around a periphery of the containment. The upstanding wall means is composed of sheet material integrally connected to the floor for containing spilled material in cooperation with the floor. Preferably, the sheet material which the floor and wall means is comprised of includes a polyurethane coated woven nylon fabric. A suitable fabric for agricultural use is available from the Seaman Corporation of Wooster, Ohio, product number 1732GCT. The sheet material may be folded up at the sides to provide the wall means or the wall means may be integrally attached to a separate floor material such as by thermal welding or heat sealing. Preferably wall means 14 comprises a rectangular wall consisting of individual upstanding walls 16, 18, 20, 22, as can best be seen in FIG. 1. It is to be understood, of course, that other wall configurations such as triangular, oval, circular, may also be used without departing from features of the invention. Upper portions of the upstanding walls are folded over to form a sleeve 24 as can best be seen in FIG. 3.

Figure 1:
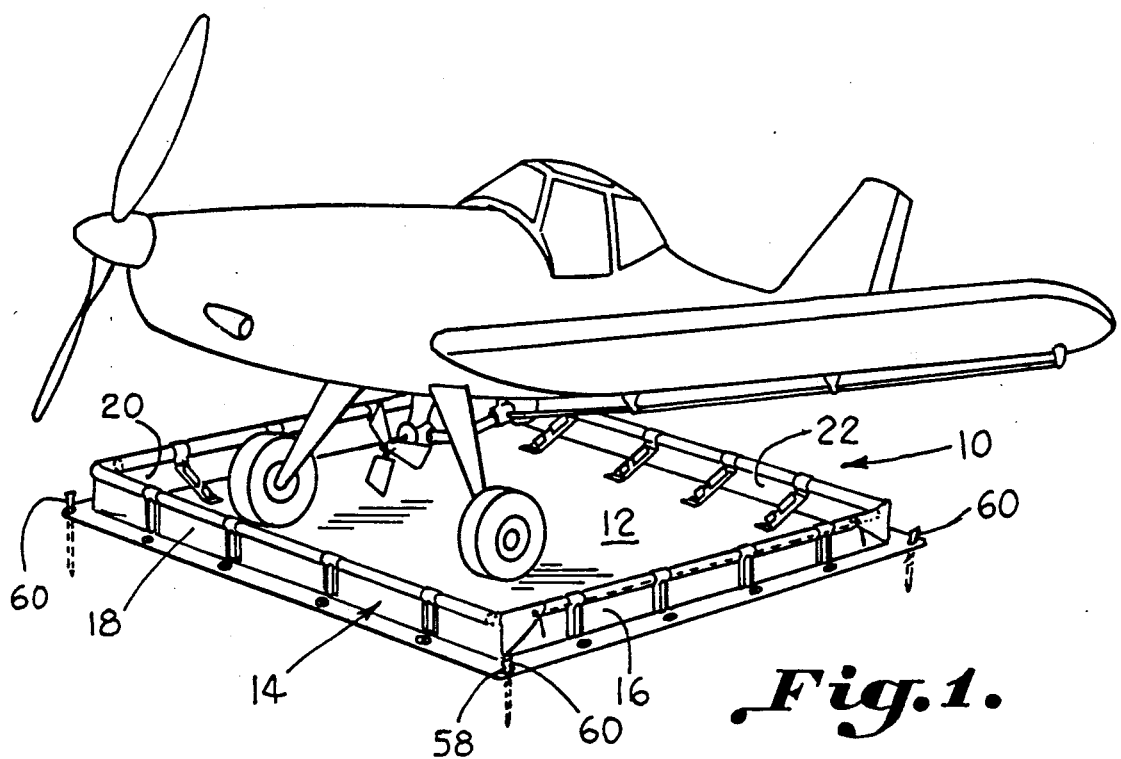
FIG. 1 is a perspective view illustrating an aircraft parked on a containment device constructed according to the invention.
Figure 4:
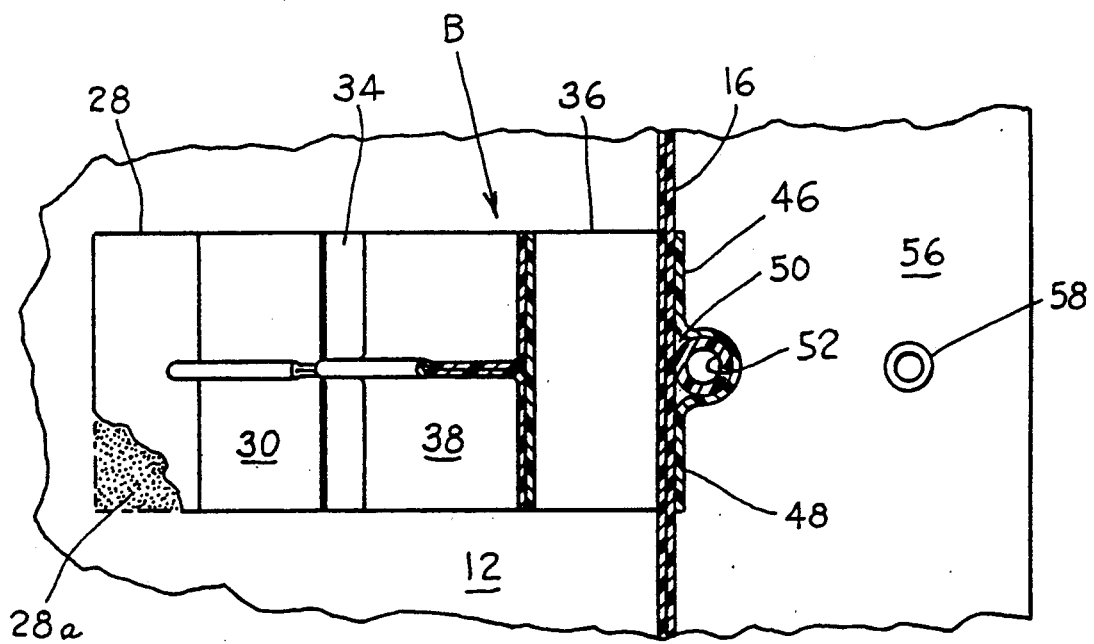
FIG. 4 is a sectional view taken along line 4—4 of FIG. 3.

Resilient brace means for bracing the walls in an upstanding position while allowing the walls to collapse when run over by a vehicle include resilient side braces A, flexible bracing straps B, and compressible horizontal top braces C. Top braces C include an elongated, radially compressible, solid foam core element 25 which is elongated and extends through sleeves 24, as can best be seen in FIG. 3. Resilient side braces A extend vertically and are attached to upstanding walls 16, 18, 20, 22 in a manner to be more fully described. Elongated, compressible top brace C is preferably a blown polyethylene foam. The polyethylene foam maintains the horizontal plane and allows vehicle traffic as it maintains its shape. Bracing straps B support the upstanding walls and retain them upright. Bracing straps B are spaced approximately every two feet with the corner straps being approximately eighteen inches from the corner. Each bracing strap includes a flexible strap 26 composed of a chemical resistant stiff polyurethane fabric. Strap 26 includes a first section 28 heat welded at 28a to floor 12, and a heat sealed T-rib 30 on first section 28. There is a gap 32 which defines a hinge at 34. There is a second section 36 which includes an elongated T-rib 38. Second section 36 is heat sealed at 40 to the upper portion of upstanding wall 16 which is heat sealed at 42 below the ridge created by foam core C inside sleeve 24. As can best be seen in FIG. 4, there is a third strap section 44 which is heat sealed down wall 16 to form side panels 46 and 48 and a second vertical sleeve 50. Received inside vertical sleeves 50 are flexible stays in the form of hollow flexible tubes 52 which define resilient side braces A. Thus, the bracing straps B begin at section 28, are heat sealed over the top of each wall, and are heat sealed down the sides of each wall to form sleeves 50 whereat straps B are terminated in a section 54 which is heat sealed to a perimetal flap 56. Perimetal flap 56 provides an anchor means for securing the containment when used with an aircraft or vehicle, as depicted in FIG. 1. Otherwise, the propeller wash would lift the containment from the ground. Perimetal panel 56 includes a series of grommets 58 for anchoring the flap to the ground such as by using stakes 60, as can best be seen in FIG. 1. This is advantageous for agricultural use when crop spraying aircraft are refueled or reloaded with chemicals at the field site.

Figure 2:
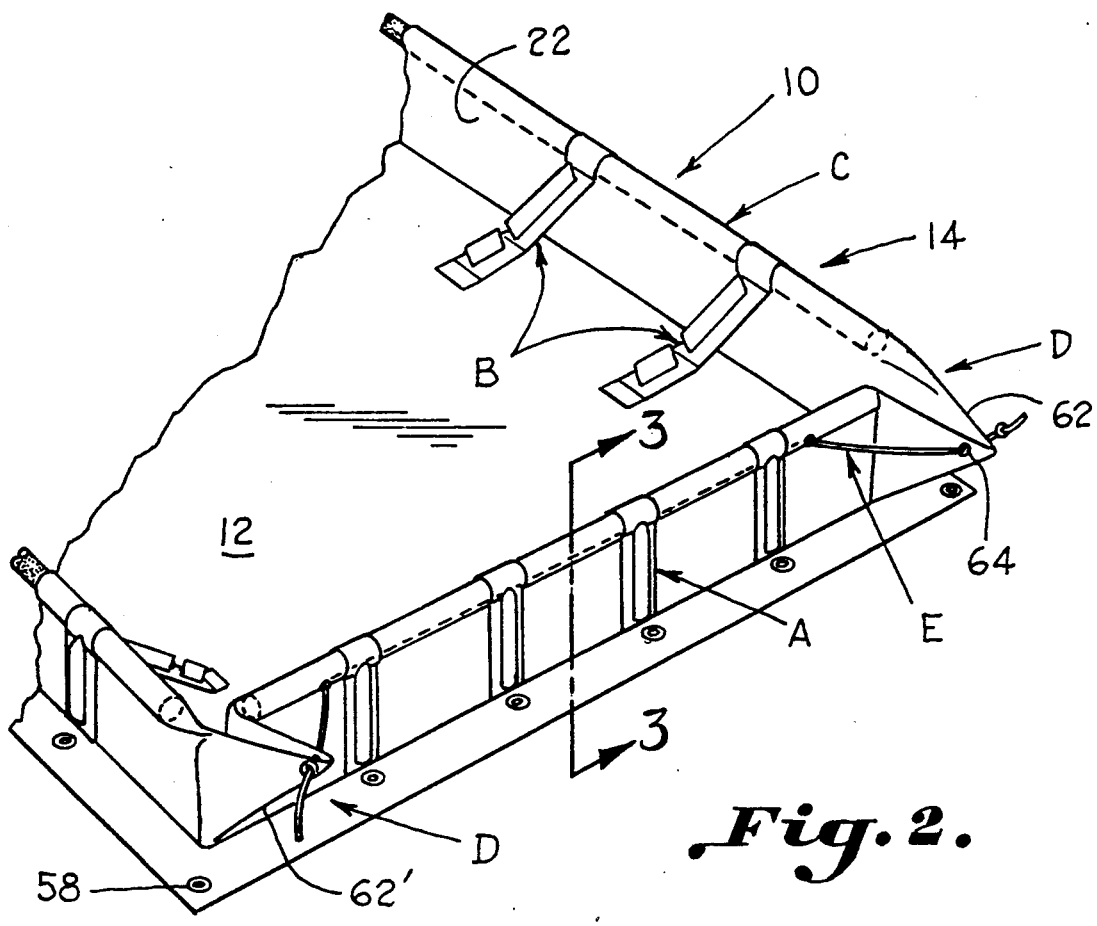
FIG. 2 is a perspective view illustrating a containment device constructed according to the present invention with part cut away.

The upstanding walls, in the illustrated rectangular embodiment, meet at corners which include elastic corner means D for yielding to the deformation, that is stretching, of the upstanding walls in the event a wheel is caught on the wall or corner as a vehicle drives onto or off of the containment. In particular, in the case of aircraft having a tail wheel, it is probable that the tail wheel will be caught on the corner or on the side wall, as can best be seen in FIG. 5. The elastic corner allows the tail wheel to deform the corner or side wall sufficiently to roll off of the containment without damaging the side wall or corner. After the vehicle has moved off of the containment, the elastic corner allows the side wall to retain its original position for containing spilled material. Preferably, the elastic corners are provided by gussets 62 formed by the sheet material being folded upon itself, as can best be seen in FIGS. 2 and 5. Elasticity is provided by an elastic cord, such as a bungi cord E, which passes through grommet 64 in the elastic corners, and extends through the hollow sleeve 24 along with foam element C, and is attached to a gusset 62' at the opposite corner of side wall 16, as can best be seen in FIG. 2. Thus, as one elastic corner is stretched, tension is placed on the remaining elastic corner to maintain the containment more or less in a stable state. Upon relief of pressure by the wheel of the vehicle, the opposite gusset under tension retracts the stretched gusset back in place.

As can best be seen in FIG. 5, horizontal compressible top braces C, extending along upper portions of the upstanding walls, brace the walls in cooperation with the resilient side braces A and flexible bracing straps B so that the upstanding walls are movable to a collapsed position, as illustrated, when run over by vehicle wheels, and are returned to the upright position after the vehicle has passed over the walls. Since there is no air inflation, the chance that the side walls will be accidentally damaged or deflated allowing the spilled material to contaminate the environment is reduced. The elastic corners allow the walls to deform without tearing the corners or without any appreciable material spill.

The containment unit incorporates a combination of fibers and coating materials to provide a reliable, reusable containment designed for agricultural pesticide application in the field or at air strips, as well as other industrial and commercial applications. The construction of the containment and materials offer an excellent flexibility to meet the practical, everyday needs of the application being made. The containment needs only minutes to be moved and set up at a different location to prevent containment and ground spills. For example, in one application, a portable containment was utilized having a size of 12'×14'. The chief concern is easy access and high likelihood of catching and preventing any spill from any vehicle location. A 7'×9' containment of the same design may be used in the field where larger volumes or surface area are not required. Both units have a 7" wall. The 7" wall is high enough to contain even large volume spills while having a low enough profile to allow easy movement of vehicles across the unit wall. The containment uses ground stakes to anchor the containment for aircraft use. The corners and wall design offer many containment options as well as durability. In addition to vehicle containment, the unit can serve as a secondary unit for mini-bulk storage; or as a basin to wash application equipment, provide containment for mixing and loading equipment, and provide containment for the loading and unloading application equipment.

While a preferred embodiment of the invention has been described using specific terms, such description is for illustrative purposes only, and it is to be understood that changes and variations may be made without departing from the spirit or scope of the following claims.

What is claimed is:

1. A portable containment for containing spilled material and preventing environmental contact, comprising:
   a floor composed of sheet material;
   deformable upstanding wall means composed of sheet material integrally connected to said floor for containing the spilled material in cooperation with said floor; and
   a plurality of vertically-extending resilient side braces attached to said wall means and spaced around a periphery of said wall means to brace said wall means in an upright position while allowing said wall means to recover resiliently and return to said upright position after collapse under force.

2. The device of claim 1, comprising:
   a plurality of bracing straps attached between said wall means and said floor to brace said wall means and thereby maintain said wall means in said upright position; and
   a horizontally-extending top brace carried by an upper portion of said wall means to brace said wall means in said upright position.

3. The device of claim 2 wherein said plurality of bracing straps are attached to said floor and said wall means by heat sealing of the ends of said straps to said floor and said wall.

4. The device of claim 2 wherein said sheet material of said upper portion of said wall means extends around said top brace and is secured to an outer surface of said upper portion to form a sleeve and surround said top brace.

5. The device of claim 4 wherein said top brace includes at least one elongated member being compressible inwardly.

6. The device of claim 5 wherein said elongated member is made of a solid compressible core material imbedded in said sleeve.

7. The device of claim 5 wherein said elongated member is formed of blown polyethylene foam and said bracing straps are formed of a chemical-resistant stiff polyurethane fabric.

8. The device of claim 1 wherein said wall means is deformable to a collapsed position when run over by a vehicle, and said side braces are resilient such that they return said wall means back to said upright position after the vehicle has passed over said wall means.

9. The device of claim 8 wherein said side braces include flexible vertical stays carried by said wall means.

10. The device of claim 9 wherein said vertical stays are carried within vertical sleeves carried vertically by said wall means.

11. The device of claim 10 wherein said vertical stays are attached to an outer surface of said sheet material of said wall means by extensions of said bracing straps which extend over each of said side braces and are secured to said outer surface to form said vertical sleeves which contain said vertical stays.

12. The device of claim 1 wherein said floor and said wall means are one piece and are formed of a chemical-resistant impermeable fabric.

13. The device of claim 1 including a perimetal flap carried by said floor and extending outwardly away from said wall means for allowing fastening of said device to a ground surface, said flap including anchor means for securing said flap to said surface.

14. The device of claim 1 wherein said upstanding wall means includes a plurality of upstanding walls joined together by a plurality of corners, and elastic corner means carried at said corners by said upstanding walls for elastically expanding and retracting to allow said upstanding walls and corners to be deformed without damage.

15. The device of claim 14 wherein said elastic corner means includes a corner gusset formed by said sheet material, and elastic means retracting said corner gusset and allowing said corner gusset to expand when said upstanding walls are deformed.

16. The device of claim 15 wherein said elastic means includes an elongated elastic strand interconnecting at least one pair of said corners at opposing ends of one of said upstanding walls.

17. A portable containment for containing a spilled material and preventing environmental contact, comprising:
   floor means;
   wall means for containing the spilled material in cooperation with said floor means;
   first wall bracing means extending vertically along said wall means for yieldingly bracing said wall means in an upright position;
   second wall bracing means having portions extending horizontally along said wall means separate from said first wall bracing means for yieldingly bracing said wall means in cooperation with said first wall bracing means maintaining said wall means in said upright position; and
   said first and second wall bracing means allowing said wall means to collapse vertically under a force while allowing said wall means to recover resiliently and return to said upright position after said force is removed.

18. The device of claim 17 including third wall bracing means attached between said wall means and said floor means for flexibly bracing said wall means in cooperation with said first and said second wall bracing means for maintaining said wall means in said upright position.

19. The device of claim 18 wherein said first wall means includes a plurality of spaced vertically extending resilient side stays, said second wall bracing means includes a horizontally-extending compressible top brace carried by an upper portion of said wall means, and said third wall bracing means includes a plurality of bracing straps carried between said wall means and said floor means.

20. The device of claim 17 wherein said wall means and said floor means are formed from a single piece of composite sheet material being a chemical-resistant and impermeable fabric.

21. The device of claim 17 wherein said wall means is deflectable to a collapsed position when run over by a vehicle, and said first and second wall bracing means are formed of resilient materials so that they resiliently return said wall means back to said upright position after the vehicle has passed over said wall means.

22. The device of claim 17 including anchor means for anchoring said device to a surface on which said floor is supported.

23. The device of claim 17 wherein said upstanding wall means includes a plurality of upstanding walls joined together by a plurality of corners, and elastic corner means carried at said corners by said upstanding walls for elastically expanding and retracting to allow said upstanding walls and corners to be deformed without damage.

24. The device of claim 23 wherein said elastic corner means includes a corner gusset formed by said sheet material, and elastic means retracting said corner gusset and allowing said corner gusset to expand when said upstanding walls are deformed.

25. The device of claim 24 wherein said elastic means includes an elongated elastic strand interconnecting at least one pair of said corners at opposing ends of one of said upstanding walls.

26. A portable containment for containing a spilled material and preventing environmental contact, comprising:

a floor composed of flexible sheet material;

a plurality of upstanding walls composed of flexible sheet material and integrally connected to said floor to contain the spilled material in cooperation with said floor;

resilient brace means carried by said walls for bracing said walls and maintaining said walls in an upright position while allowing said walls to collapse under force when run over by a vehicle and resiliently return to said upright position after said force is removed; and an elastic corner means formed adjacent ends of said upstanding walls which includes a corner gusset formed by said sheet material, and elastic means retracting said corner gusset and allowing said corner gusset to expand when said upstanding walls are deformed.

27. The device of claim 26 wherein said elastic means includes an elongated elastic strand interconnecting at least one pair of said corners at opposing ends of one of said upstanding walls.

28. The device of claim 27 including a hollow sleeve carried by said upstanding walls; said resilient brace means including a horizontally-extending compressible top brace carried in said hollow sleeve; and said elastic strand carried in said hollow sleeve interconnecting said pair of corner gussets.

29. The device of claim 1 wherein said resilient brace means includes a plurality of flexible bracing straps attached between said walls and said floor to brace said walls in cooperation with said plurality of side braces and maintain said walls in an upright position.

30. The device of claim 29 including horizontally-extending top braces extending along an upper portion of said walls to brace said walls in cooperation with said plurality of side braces and said plurality of bracing straps and maintain said walls in an upright position so that said walls are movable to a collapsed position when run over by a vehicle; and said side braces, said bracing straps, and said top braces cooperate to return said walls to said upright position after said vehicle has passed over said walls.

* * * * *